SEATING PLAN TOWN THEATRE

INVENTOR
HAROLD RUSCHER

Feb. 11, 1969     H. RUSCHER     3,427,438

TICKET VENDING SYSTEM AND EQUIPMENT

Filed Jan. 7, 1964     Sheet 2 of 7

INVENTOR
HAROLD RUSCHER
BY
Frank M. Murphy
ATTORNEY.

Feb. 11, 1969 H. RUSCHER 3,427,438
TICKET VENDING SYSTEM AND EQUIPMENT
Filed Jan. 7, 1964 Sheet 4 of 7

INVENTOR
HAROLD RUSCHER
BY
Frank M. Murphy
ATTORNEY.

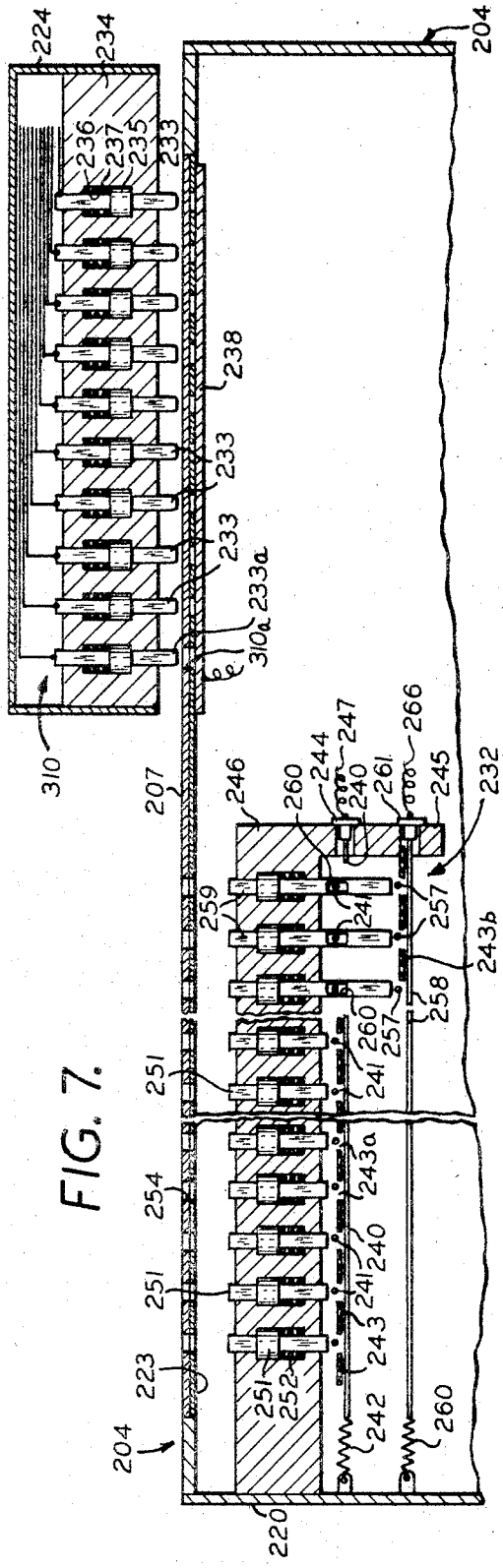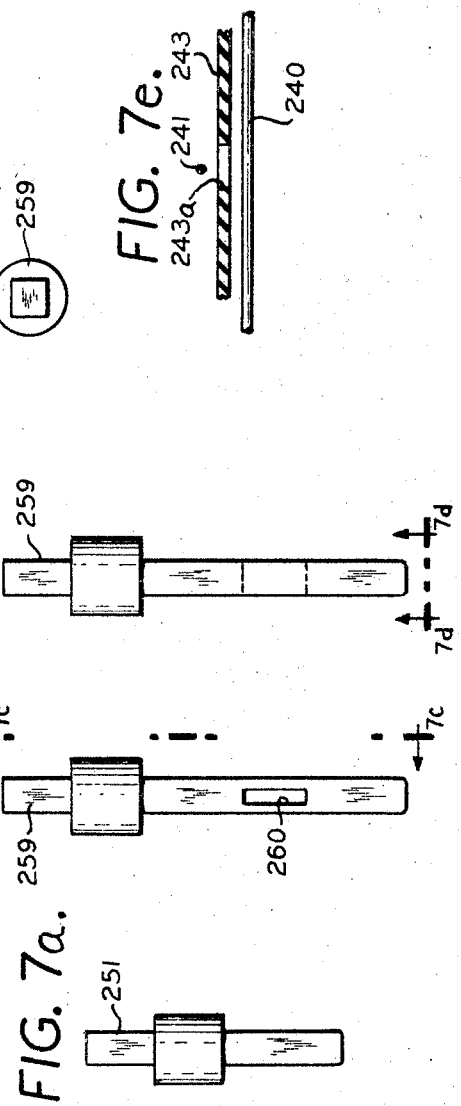

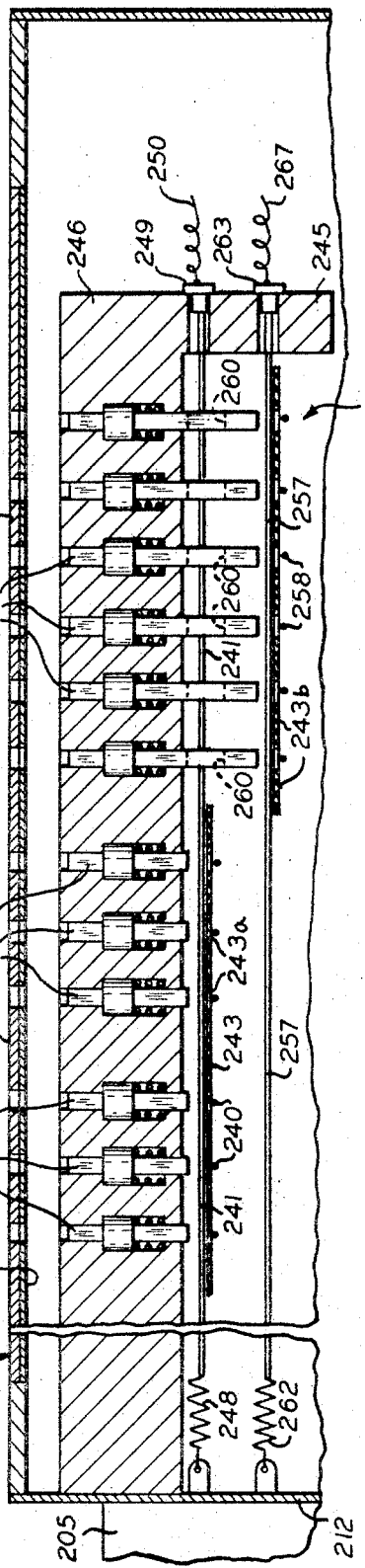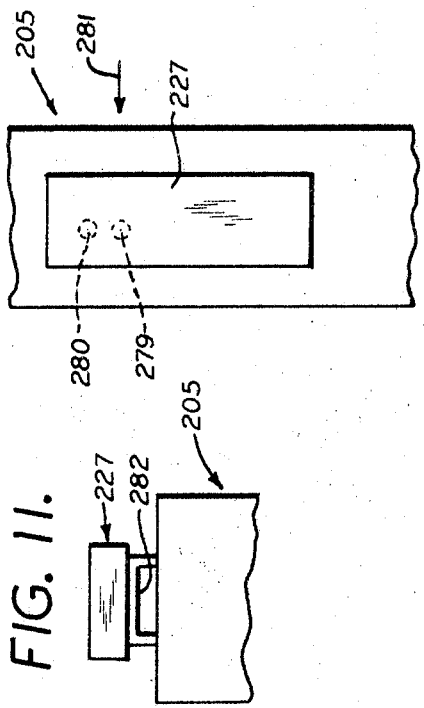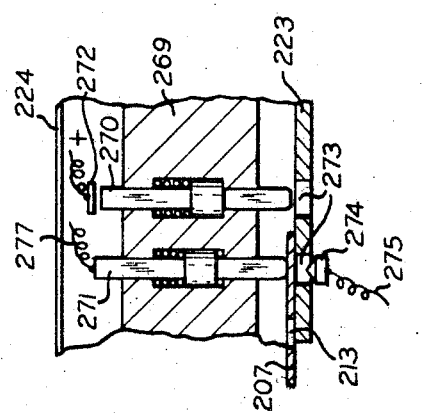

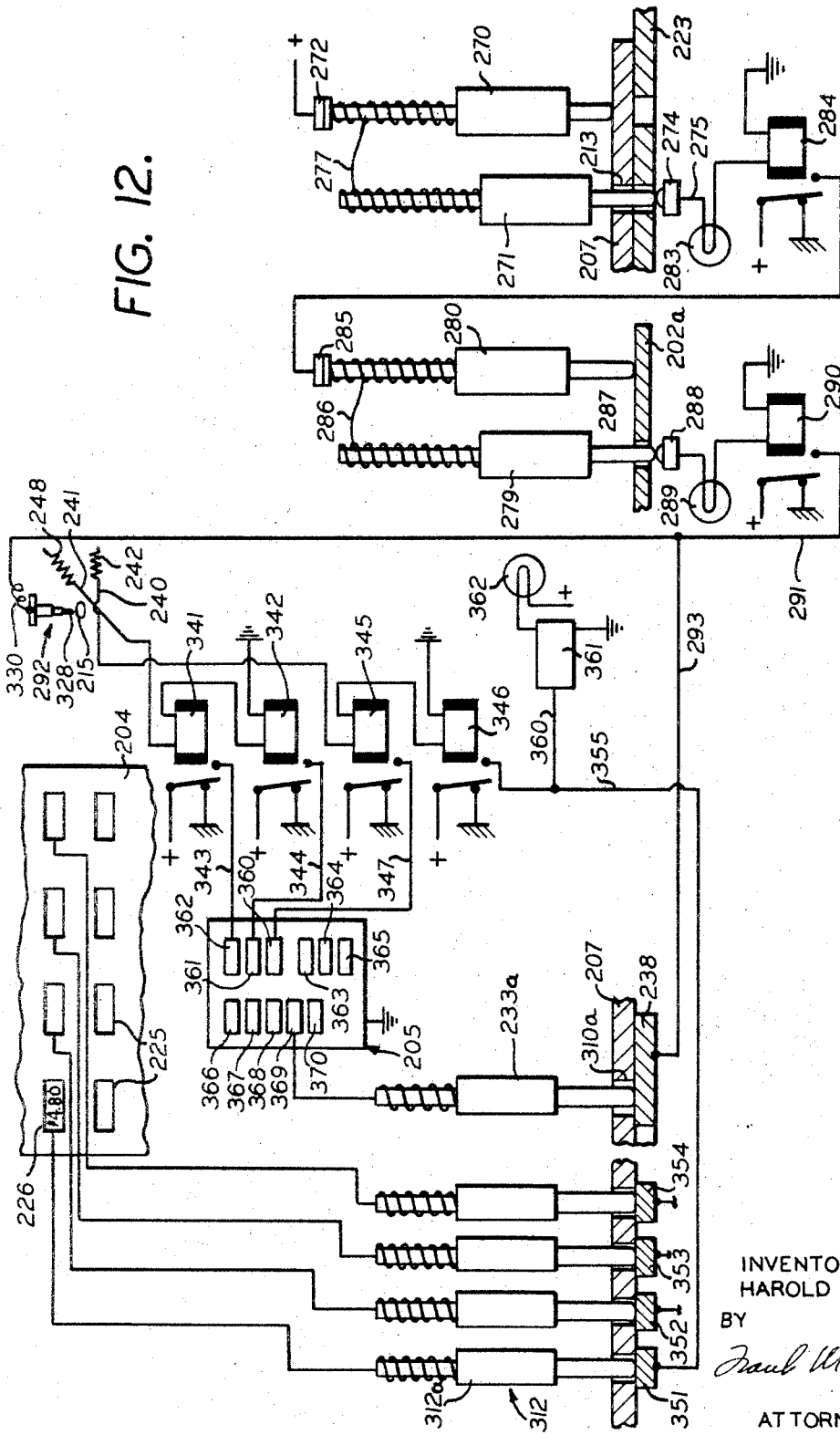

__United States Patent Office__ 3,427,438
Patented Feb. 11, 1969

3,427,438
TICKET VENDING SYSTEM AND EQUIPMENT
Harold Ruscher, Bedford Village, N.Y., assignor of one-fourth to Dorothy Ruscher, and one-half to Harold Ruscher, Jr., Westchester, N.Y.
Filed Jan. 7, 1964, Ser. No. 336,244
U.S. Cl. 235—61.6      22 Claims
Int. Cl. G06k 3/02, 17/00

---

ABSTRACT OF THE DISCLOSURE

Tickets are produced in response to specific requests for individual tickets and simultaneously a record can be made of tickets sold. A chart having the seating layout of, for example, a theater, is placed in a selector having electrical components corresponding to the seating layout. The appropriate electrical component for the desired seat can be selected by reference to the chart and activated. This serves to activate a printer which prints information on a ticket. Simultaneously, with the selection and activation, the chart can be marked to indicate that a ticket for the selected space has been issued.

---

This invention relates to a ticket vending system suitable for use, for example, in connection with the sale of tickets for theater performances, sporting events, travel accommodations, and the like.

In the usual manner of marketing tickets, the total ticket requirements are printed in advance of the first sale. In the case of a single performance, one ticket is printed for each space to be offered for sale and each ticket is marked to identify the space to which it applies. Where multiple performances are involved, as is commonly the case in the theater business and many sports, tickets for all scheduled performances are printed in advance. Where the conventional vending practice is followed, for but one performance, advance printing is essential; for multiple performances, the savings offered by having all tickets printed at once permits advance purchase of total ticket requirements.

This conventional vending procedure has many disadvantages. Thus, waste is a factor since absent sell-outs worthless tickets remain.

Storing is cumbersome and involved. This can readily be appreciated for the case of a major league baseball team where some 80 home performances are involved. The tickets must not only be stored for a long time, but must be maintained in a particular order. In actual practice some baseball teams maintain numerous and large, bulky, compartmented storage cabinets, in which the tickets are stored in small groups, the members of which have some common character, such as first base line boxes. The tickets are thus in a form convenient for dispensing, but the bulk and expense of the cabinets renders the system unattractive. It must be remembered that in general, from the time the first ticket is sold, tickets for all performances should be accessible since purchases are commonly in advance and for a time suiting the purchaser's wishes.

Another problem is with respect to maintaining a record of available unsold space. Commonly, knowledge of what space is available for sale is acquired by examination of the stock of tickets remaining. This is unsatisfactory since, as a practical matter, accurate determination is not possible, where, for example, the tickets are say half-sold.

A further problem is in regard to the dollar and cents accounting. An inventory of unsold tickets can be made but such is time consuming and expensive. Alternatively, a record of sales can be maintained. This is undesirable since, in the marketing of tickets, the time at which sales are made is extremely valuable and anything requiring time for other than the sales, is to be avoided.

Pilferage is another problem. Since accounting is difficult, the likelihood of pilferage is great.

The present invention is particularly concerned with providing a procedure for vending tickets which is free of the above-mentioned and still other disadvantages involved in the vending of tickets in the conventional manner.

An object of the invention is to provide a system for vending tickets characterized in that blank tickets are stored ready for use and at the time of sale are marked with appropriate information respecting the ticket.

Another object of the invention is a system including apparatus suitable for marking the ticket at the time of sale with the appropriate information, which apparatus is convenient and simple and dependable in operation.

Another object of the invention is a system wherein apparatus as aforesaid is provided, and there is also provided a performance chart for use with the apparatus, the performance chart including a layout of the theater, arena, or the like, at which the event of interest is to be held, and the performance chart and apparatus being for use in combination in the manner that the desired space is selected by reference to the performance chart and manipulation of the apparatus to effect operation of the marker in accordance with the space desired.

Another object of the invention is a performance chart and apparatus as aforesaid, and wherein means are provided for conveniently marking the chart to indicate space sales, whereby the spaces sold and spaces available for sale can be determined by observing the chart, and whereby unauthorized issuance of tickets can be checked by comparing the chart marked to indicate spaces sold, with the empty seats in the theater or the like at the time of the performance.

Another object is a system including apparatus as aforesaid, and further including a plurality of performance charts, one for each of a plurality of performances, and wherein the chart for any desired performance can be placed on, and removed from, the apparatus in accordance with sales.

Another object is a system including apparatus as aforesaid and a performance chart or charts, the performance charts being coded with information applicable to all spaces of a given performance (such as the date), and wherein the apparatus is provided with means for sensing such coded information and marking the tickets accordingly.

Another object is a performance chart perforated in a manner corresponding to the seating arrangement of the theater, arena, or the like, at which the performance is to take place.

Another object is a perforated performance chart as aforesaid, coded as aforesaid, the coding being by perforations in the chart.

Another object of the invention is a system including apparatus and a performance chart as aforesaid, and utilizing a plurality of sets of tickets, the ticket of each set, in blank form, being the same and having some but not all of the information printed or marked thereon prior to processing of the ticket in the apparatus.

Another object of the invention is a system with apparatus, charts, and sets of blank tickets as aforesaid, and wherein the tickets of each set are the same color and the color for each set is different, whereby color can be used to indicate, in some measure, ticket classification.

Another object is a system with apparatus, charts, and sets of blank tickets, as aforesaid, wherein the tickets of each set are all for a given price ticket, whereby accounting for unsold tickets and rapid handling in selling is facilitated, the tickets of each set desirably being numbered in the order in which they are stacked.

Another object of the invention is a system including means for registering the amount of each sale at the time of the sale.

Another object of the invention is a sale-registering means wherein the sales of different price tickets are recorded separately.

Another object is sales-registering means as aforesaid and in combination with apparatus as aforesaid.

Another object of the invention is the combination of sales-registering means as aforesaid, with sets of tickets of different color, the color indicating price.

The manner in which these and other objects of the invention are attained will be apparent from the following description.

The invention is further described in reference to the accompanying drawings, wherein an embodiment of the invention is depicted.

In the drawings:

FIG. 7 is a cross-sectional view taken along line 7—7 in FIG. 6;

FIG. 7a is an elevation view of one type of depress contact shown in FIG. 7;

Figure 1:
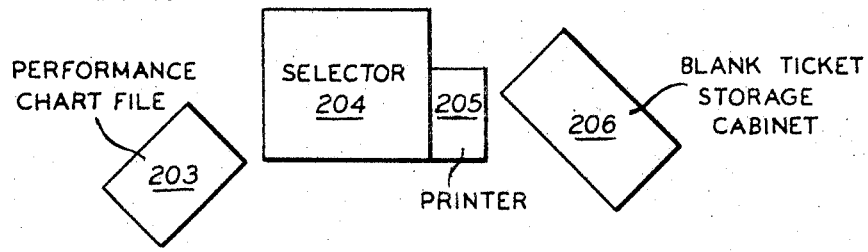
FIG. 1 is a plan view indicating an equipment layout of apparatus according to the invention.
Figure 5:
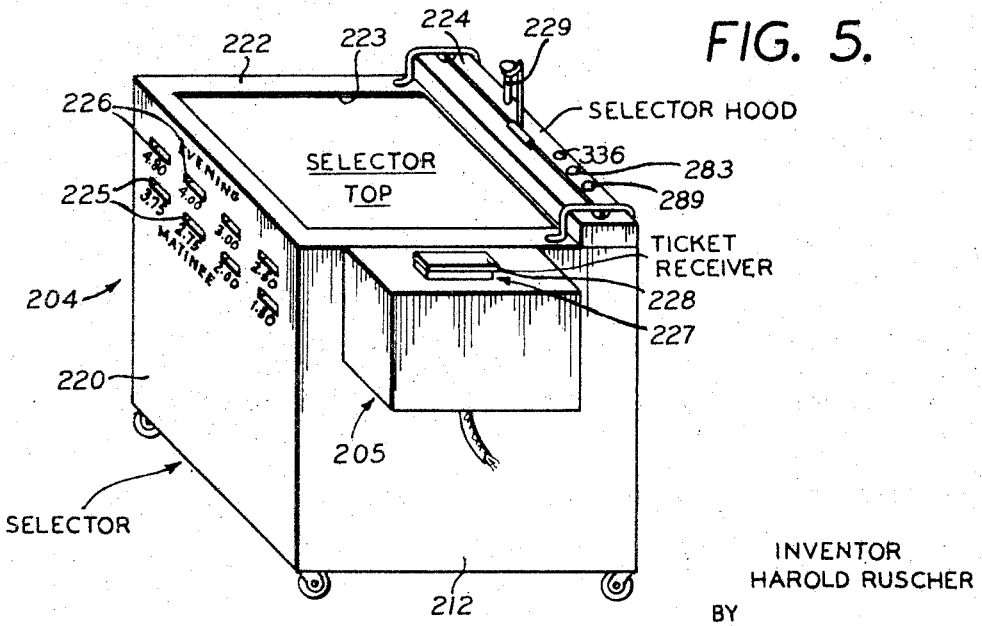
FIG. 5 is an isometric view of a selector as is shown in FIG. 1.
Figure 6:
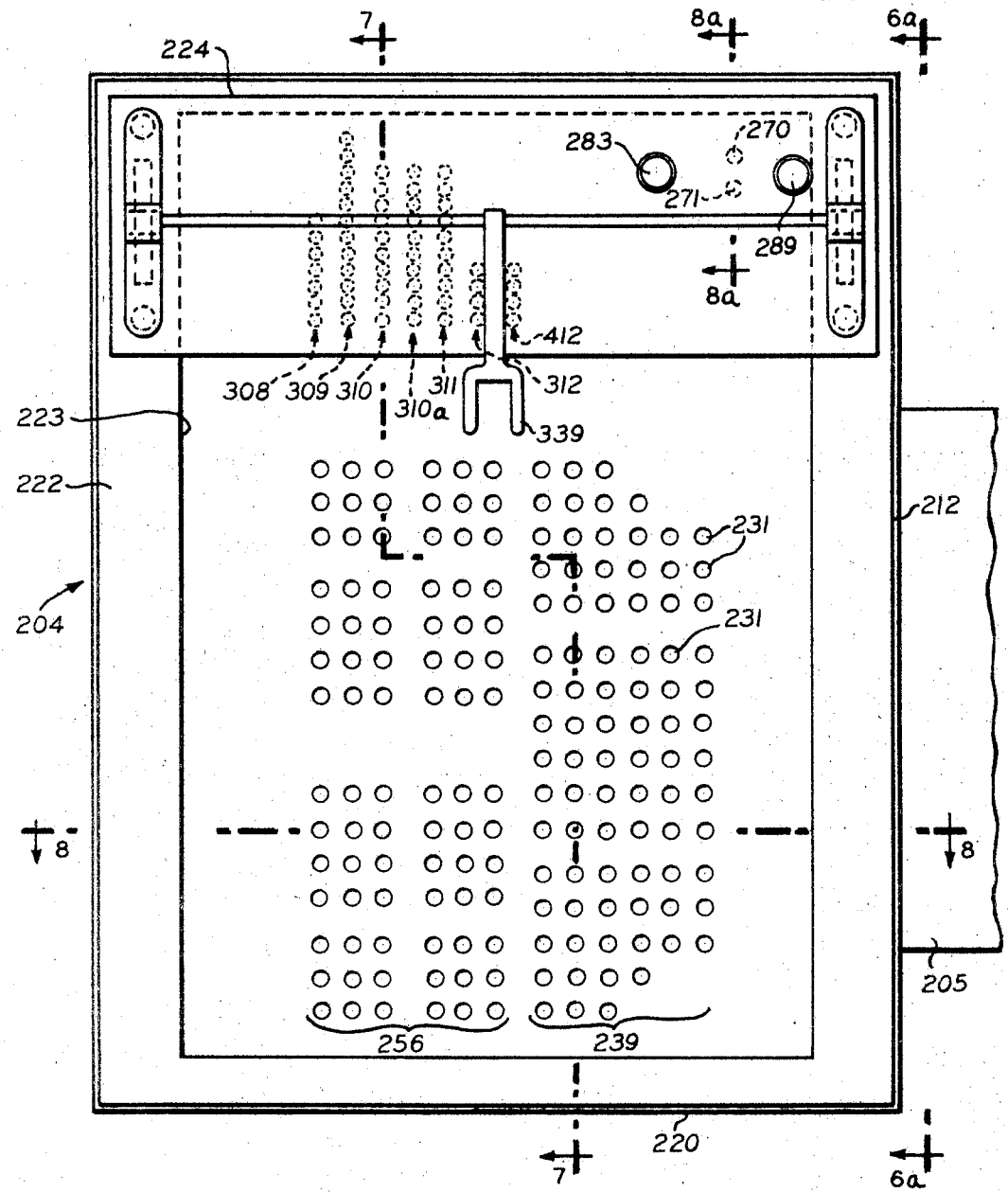
FIG. 6 is a plan view of the selector shown in FIG. 5 showing the top of the selector as it would appear when a performance chart is not in place in the selector.
Figure 10A:
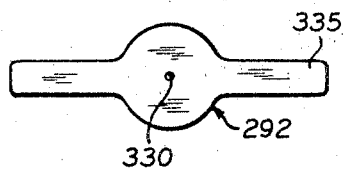
Figure 9:
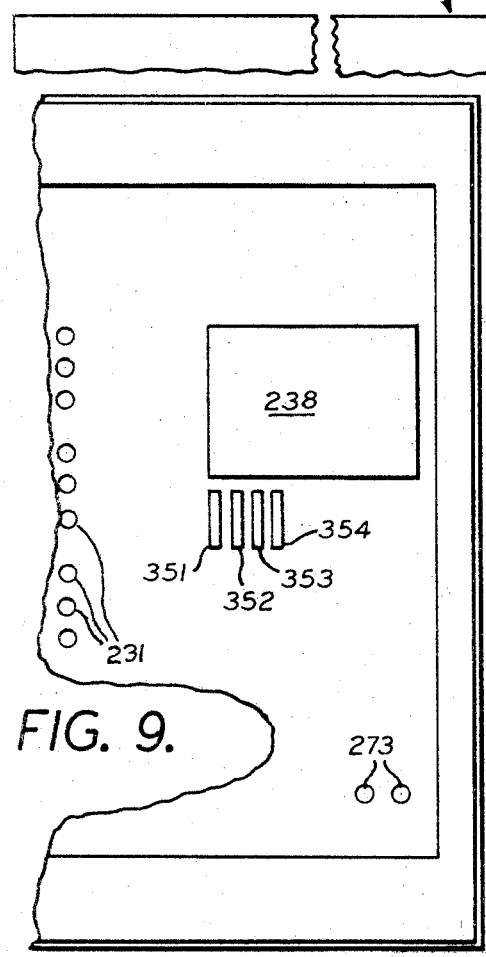
Figure 10:
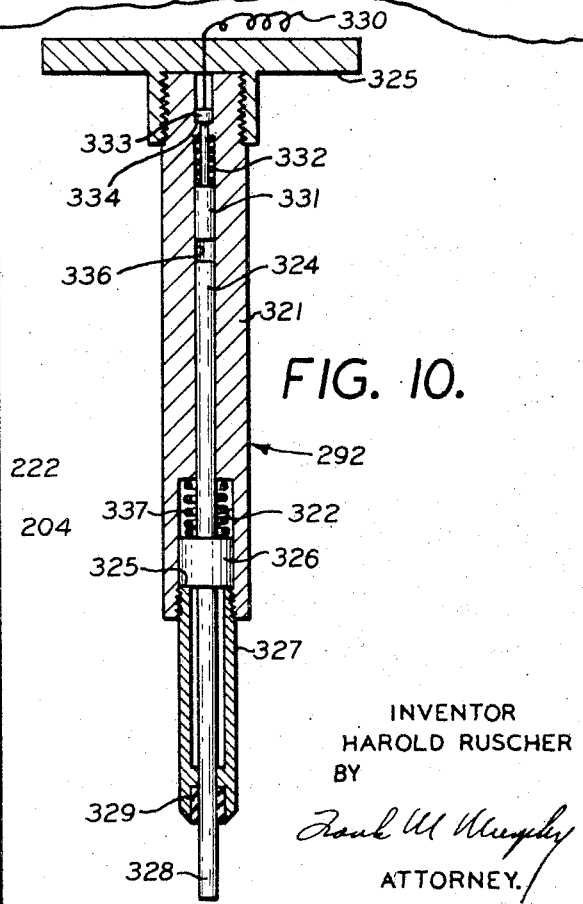

FIG. 7b, FIG. 7c, and FIG. 7d, are views of another type of depress contact and are respectively a first elevation view, a second elevation view, the said second elevation view being from line 7c—7c in FIG. 7b, and an end view from line 7d—7d in FIG. 7c;

FIG. 8 is a cross-sectional view corresponding to the view shown in FIG. 7 except that FIG. 8 is at right angles to the showing in FIG. 7, the showing in FIG. 8 is taken along line 8—8 in FIG. 6; FIG. 7e is an enlargement of a portion of the circuit shown on the left side of FIG. 7;

FIG. 8a is an elevation view taken along line 8a—8a in FIG. 6 and shows depress contacts in the starting circuit of the selector utilized to activate circuits upon placement of a performance chart on the selector;

FIG. 9 is a partial top plan view of the selector with the hood of the selector removed;

FIG. 10 is an elevation view in cross-section of a stylus used for operation of the selector and as is shown in FIG. 5 mounted atop the hood for the performance chart code area;

FIG. 10a is a top view of the stylus shown in FIG. 10;

FIG. 11 is a front elevation view of the electronic printer mounted on the side of the selector and which is shown in FIG. 1 and FIG. 5, the top portion only of the electronic printer being shown in FIG. 11;

FIG. 11a is a plan view of the electronic printer as is shown in FIG. 11, and showing a portion of the top of the printer; and FIG. 12 is a schematic wiring digram for the selector and printer of the apparatus represented in the drawings.

In the various views of the drawings, like reference characters indicate corresponding parts.

Figure 2:
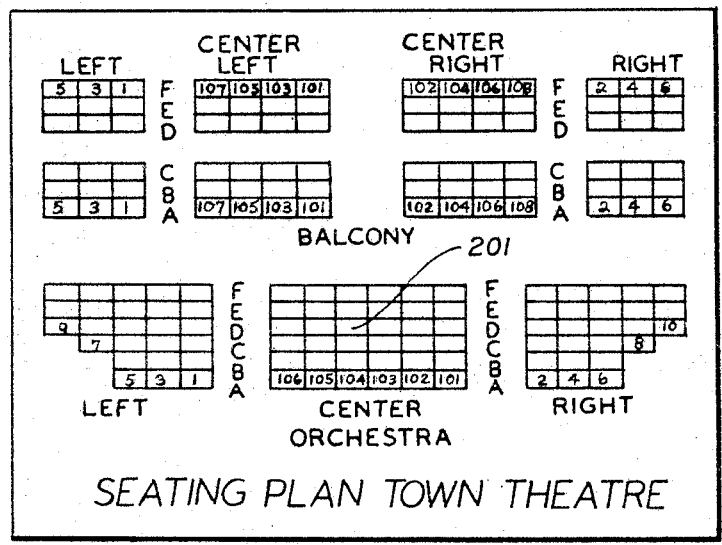
FIG. 2 is a layout of a theater seating arrangement, with reference to which the embodiment of the drawings is described.

The ticket handling system depicted in the drawings is for a theater and is particularly designed to facilitate the handling of tickets for a theatrical production presented in numerous matinees and evening performances. A layout or seating plan for the threater is shown in FIG. 2. The seats are divided into orchestra and balcony seats. The orchestra seats are divided into left, center, and right seat groups, the seats being assigned row letters and seat numbers in a conventional manner, i.e. the horizontally extending lines of seat rows being assigned letters while the vertically extending lines of seats are assigned numbers. This system is indicated for the orchestra section in FIG. 2, and for this system, as is conventional a seat is specified by stating a row letter and a seat number. Thus, the theater space indicated by the reference numeral 201 is specified by the notation: Row D, Seat 104. The balcony of the theater is laid out to provide the seat groups left, center left, center right, and right, and the system for designating particular spaces in these various seat groups is similar to that used for the orchestra section, as is indicated in FIG. 2.

For the theater and the performance here assumed, there are four prices for matinee tickets and four prices for evening tickets, the price depending on the seat location (orchestra or balcony and location within orchestra or balcony), and whether the performance is a matinee or evening performance. Eight sets of tickets are provided, there being one set for each price ticket for matinee and evening performances. All of the tickets bear printing for information common to all of the tickets, and the tickets of each set bearing printing information as is common to the tickets of each set. In the processing of the ticket according to the invention, further information as is applicable to a particular ticket sale is provided on the ticket by printing thereon or perforation thereof, at the time of sale. The sets of tickets are further distinguished by color, all of the tickets of each set being one color, and the color of each set differing from the color of all the other sets. The tickets bearing some information and ready for processing are herein referred to as blank tickets, and the tickets after processing to complete the information are referred to as issued tickets.

Figure 3:
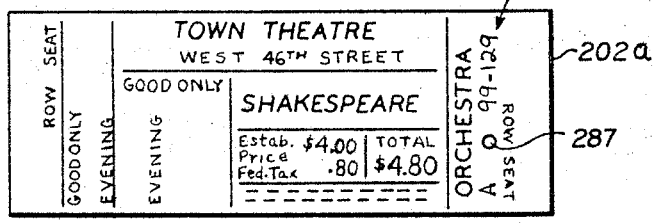
FIG. 3 and FIG. 3a show, respectively, a theater ticket prior to processing in the device of the invention and after processing in the device of the invention.
Figure 3A:
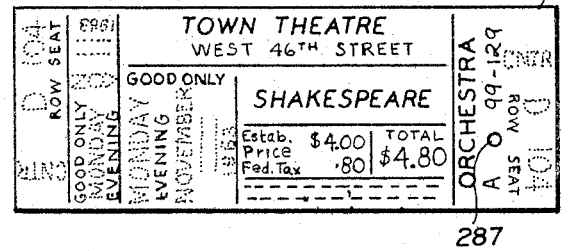

A blank ticket 202a is shown in FIG. 3, and an issued ticket 202b is shown in FIG. 3a. Referring to the blank ticket shown in FIG. 3, all of the tickets are printed to indicate the theater, the theatrical production and are printed to indicate areas in which further information is to be provided in issuing of the ticket, such as the indication "ROW" and "SEAT" to indicate the areas in which the row and seat specifications are to be placed. Further, the tickets of each group are marked to indicate the information as is common to the tickets of the group in question. Thus, the tickets of each group are all marked with a ticket price. In a blank ticket shown in FIG. 3, the price of $4.80 made up of an admission price of $4.00 and tax of $0.80. Further, the tickets of each group are marked to indicate whether they are for orchestra or balcony sections and whether for matinee or evening performances. To facilitate accounting, the tickets of each group are marked with indicia to, in effect, provide a numbering of the tickets of each group. Thus, the blank shown in FIG. 3 is marked as is indicated at 202 with the indicia "A 99–129." This indicia would appear on but one of the tickets of this group, and the ticket disposed to be used following use of the ticket blank in FIG. 3, would be marked, for example, "A 99–130." Thus, by suitable stacking and observing of the indicia 202, it can readily be determined how many blank tickets were processed for sale in the group to which the blank of FIG. 3 belongs to.

In the processing of a ticket in the system, additional information as is necessary to complete the ticket and provide an issue ticket is placed on the blank. An issue ticket obtained from the blank shown in FIG. 3, for the November 11, 1963, Monday, evening performance, for Row D, Seat 104, in the center section of the orchestra is shown in FIG. 3a. The information added to the ticket, in this example by perforating, is: Row, Seat, Section, month, day of month, year and day of week.

It will be observed that the information added to the blank ticket to provide the issued ticket can be divided into information which is common to all tickets issued for a particular performance, and information which is variable for the particular performance to which the ticket applies. Thus, common to all tickets for a given performance will be: month, day of month, year and day of week; and variable for a particular performance will be: row, seat, and section such as left, center, or right. Price and orchestra or balcony is also a variable with respect to each performance, but these variables are allocated among ticket groups, and accordingly the blanks of each group are pre-printed with such information.

A performance chart is provided for each performance and each performance chart bears information fixed for the particular performance to which it applies. Thus, the chart for the November 11, 1963, Monday evening performance will bear indicia indicating such information. Suitable equipment is utilized for sensing this performance chart information and transferring it to the blank ticket. Further, suitable equipment is provided for selecting from among the variables applicable to a given performance and for transferring this information to a blank ticket.

Equipment for the system is indicated in FIG. 1 and includes a performance chart file 203, a selector 204, a printer 205 which is secured to the side of the selector, and a blank ticket storage cabinet 206. The blank ticket storage cabinet can be provided with a gravity feed tube for the tickets of each ticket group, and in the case here described, can include 8 gravity feed tubes (not shown), one tube for each price ticket. Blank tickets can be removed from the cabinet manually, when desired.

Figure 4:
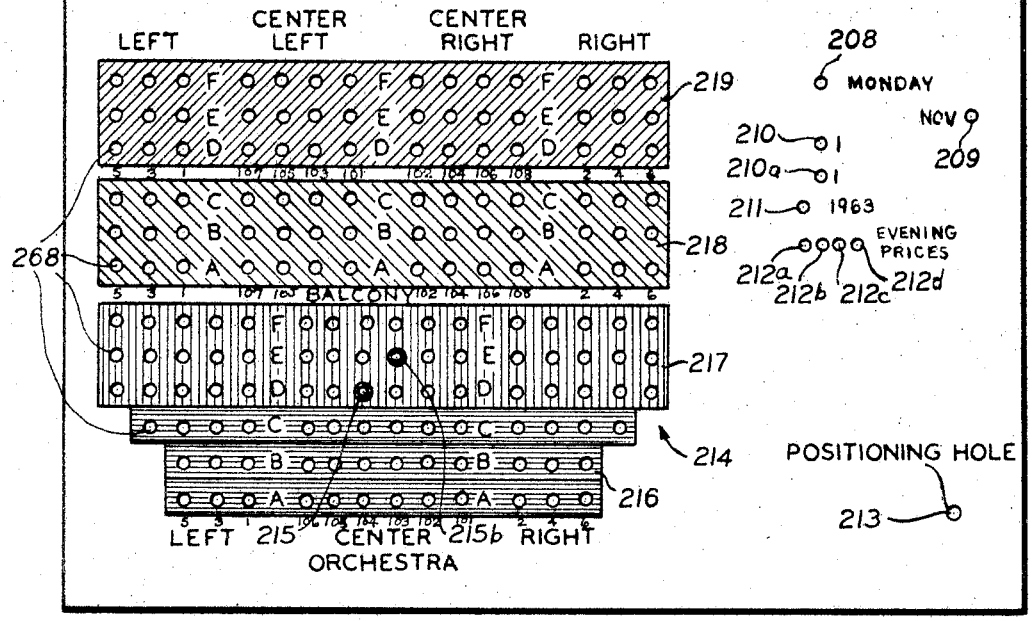
FIG. 4 is a plan view of a performance chart, which is representative of the performance charts stored in the performance chart file shown in FIG. 1.

The performance chart file 203 is a file cabinet suitably constructed to permit convenient storage of performance charts. As mentioned above, there is a performance chart for each performance and thus, there is a performance chart for the November 11, 1963, Monday, evening performance. The performance chart for this performance is shown in FIG. 4.

The performance chart, indicated generally by the reference character 207, includes an area coded to provide on the chart information corresponding to that information which is fixed for each performance and which is therefore fixed for the particular performance chart here considered. This coded information includes the perforation 208 for the day of the week, the perforation 209 for the month, the perforations 210 and 210a for the day of the month, the perforation 211 for the year. The manner in which this coded material is sensed and transmitted to a ticket will be described in detail hereinafter.

Further, the performance chart 207 includes a marked and perforated area indicated generally by the reference numeral 214. It will be observed that the area 214 is marked in a manner generally corresponding to the theater seating arrangement as this arrangement is indicated in FIG. 2. Thus, this area is perforated with perforations laid out in a manner generally corresponding to the seating arrangement shown in FIG. 2 and there is a perforation for each seat. The space, Row D, Seat 104, center section of the orchestra, is indicated by the reference numeral 215. This perforation 215 is shown in the drawing with a dark border. The significance of this border will be indicated hereinafter. The lettering to indicate row and the numbering to indicate seat lines in the area 214 corresponds with the seat designation system utilizing letters and numbers, shown in FIG. 2. Further, the area 214 is divided into areas corresponding to different seat prices, by utilization of different colors. Thus, the price for the orchestra seats, rows A–C is the same for all sections (left, center and right), and, accordingly, the portion of area 214 for these seats, indicated on the drawing by the reference character 216, is colored blue. The orchestra seats in rows D–F are all one price and the area 217 for these seats is colored red. Similarly, balcony area 218 is colored green, and balcony area 219 is colored brown.

Additionally, the performance chart 207 includes, adjacent the coding for the fixed variables (perforations 208–211) perforations 212a, 212b, 212c, and 212d, for the four prices for evening performances. Also the performance chart is provided with a perforation 213 which serves as a positioning hole. The manner in which the performance chart is utilized will now be described.

The performance chart 207 (FIG. 4) is utilized in connection with the operation of the selector 204 shown in FIG. 1, FIG. 5. Referring to FIG. 5, the selector is a cabinet mounted on wheels to facilitate the movement thereof and includes a front panel 220 and side panel 212 and top panel 222. The top panel 222 is provided with a recessed area 223 proportioned to receive the performance chart. Mounted at the rear of the recessed top is a hood or cover 224. The electronic printer 205 is mounted on the side panel 212 of the selector. The front panel 220 of the selector is provided with windows 225 and 226.

In operation of the selector 204, the performance chart 207 is placed in the recess 223 of the selector top 222, with the end of the performance chart coded with the fixed variables by perforations 208–211 and price data by perforations 212a–212d (FIG. 4) under the hood 224, and the area 214 of the performance chart, which area indicates the theater seating arrangement, exposed to the view of the operator. A blank ticket can then be placed in the ticket receiver 227 of the electronic printer 205 (FIG. 5).

After the chart and ticket have been positioned in, respectively, the selector and the electronic printer, the performance chart code hood and the ticket hood 228 are depressed and are locked in a lower position. Means are provided for indicating whether, following depression of the hood 224 and the hood 228, the chart and ticket are properly positioned in, respectively, the selector and the electronic printer. Provided the chart and ticket are properly positioned, the selector and electronic printer are energized and, further, appropriate circuits are made so that the fixed data coded on the portion of the performance chart beneath the hood 224, is sensed and transmitted to the electronic printer. For selection of variables applying for the performance chart, a stylus 229 (FIG. 5) is provided and this stylus is manually manipulated to make selection from the area 214 of the performance chart, which area corresponds to the theater seating arrangement. Thus, the stylus 229 is removed and the lower end thereof is inserted through the perforation in the area 214 which corresponds with the particular theater space which it is desired to indicate on the ticket. The recessed portion 223 of the selector top 222 is perforated, as is more particularly described below in reference to FIG. 6, to permit the inserted end of the stylus to be passed through the top of the selector. Within the selector are circuits provided to be actuated by operation of the stylus, and these circuits, upon such actuation, serve to send information to the electronic printer corresponding to the particular space location selected. The electronic printer imparts this information to the ticket to provide an issued ticket.

The selector performs the further function of recording ticket sales. Within the cabinet (and not shown in the drawing), are registering means for recording and registering the number of ticket sales according to each price ticket, and the registering means can be provided to tally the total amount of sales for each price ticket. Thus, sales of matinee tickets are tallied on counters viewed through the four lower windows 225 (FIG. 5) and sales of evening tickets are tallied on counters viewed through the four upper windows 226. The manner in which the registering means are operated in response to the issuing of a ticket is described in detail hereinafter.

Details of the means provided for the performance of the functions described above, will now be set forth.

Referring to FIG. 6, FIG. 7, and FIG. 8, the recessed portion 223 of the top 222 of selector 204 is provided with perforations 231 arrayed to be in alignment with the perforations of the performance chart when the performance chart is in place on the top of the selector. Beneath the area bearing the perforations 231, there is an electrical wiring arrangement 232 shown in FIG. 7. Further, within the hood 224 is another electrical wiring arrangement 232, as can also be seen in FIG. 7.

It will be recalled, with reference to FIG. 4, that one end of the performance chart is marked to code the chart with information which is fixed for the particular performance chart. The chart perforation 208 is for the day of the week, such as Monday, Tuesday, etc., and the position of the perforation on the chart depends on the particular day designated. Within the hood 224 of the selector, is a line of depress contacts 308 (FIG. 6), there being one such depress contact for each day (7 depress contacts). The day of the week perforation in the chart is disposed so that when the chart is in place on the selector, it will underlie one of the contacts in the line of contacts 308 in the hood 224. In like manner, each performance chart contains one perforation 209 for the month, and within the hood 224 there is a line of depress contacts 309 for the month, and the perforation in the chart for the particular month is always disposed along a line such that when the chart is in position on the selector, one of the depress contacts 309 will overlie the month perforation in the chart. As for the day of the month, which is coded on the chart (FIG. 4) by perforations 210 and 210a, here a two-digit number must be provided for, and, accordingly, in the hood 224, two lines of depress contacts, 310 and 310a are provided. The perforations for the day of the month in the chart are always such that with the chart in place on the selector, one or two, depending on whether the date is a single digit or two digit number, of the depress contacts 310 and 310a will overlie the perforation or perforations in the chart. In a similar manner, the chart is provided with perforation 211 for the year, and within the hood 224 is a line of depress contacts 311, and the perforation in the chart is arranged with respect to the depress contacts for the year in a manner described above with reference to other fixed data such as day of the week, etc.

Also beneath the hood 224, are the lines of depress contacts 312 and 412. These lines are for utilization in a circuit for registering ticket sales on the counters which can be viewed through the windows 225, 226 in the front panel of the selector, as shown in FIG. 5. The line of contacts 312 is for evening prices and the line of contacts 412 is for matinee prices. The ticket price is not fixed for each performance chart, but rather is variable depending upon seat location, though, for a given performance chart, there will be only four possible prices rather than eight possible prices, since each chart is for either a matinee or an evening performance, there are but four prices for matinee and four for evening. The chart perforations 212a, 212b, 212c and 212d are positioned so that they will underlie either the line of contacts 312 or the line of contacts 412 (both of which lines of contact are in the hood 224, FIG. 6) depending on whether the chart is for an evening performance or a matinee.

The mounting of the various depress contacts in the hood 224 is the same and this mounting is indicated by the section shown in FIG. 7, which is taken along line 7—7 in FIG. 6, and thus shows the line of contacts 310. This line of contacts is for one of the digits for the day of the month, and hence, there are ten contacts 233 in the lines of contacts 310. Each of the contacts 233 is mounted in the hood block 234 which can be of plastic suitably bored to hold the contacts. The contacts each have an enlarged center portion 235 which is received in the recess 236 of the block 234. The contact is axially movable in the block 234 and is urged downwardly by the spring 237. Connected to the upper end of each contact, is a conductor of the circuit in which the contact is provided. Beneath the hood 224, and mounted in the top of the selector 204, is a plate 238. This plate, when the device is set up for operation is energized, and thus, contact between the depress contacts 233 and the plate 238 can serve to close a circuit. In operation of the device, with a chart in place in the selector, upon depressing the hood 224, contact between any given depress contact 233 and the plate 238 is made, or is prevented, depending upon whether or not there is a perforation in the chart permitting the contact to be moved through the chart to engagement with the plate 238. Such is the general manner of operation of the contacts 233 in the hood 224. The operation of the circuits in which the contacts are connected is described in more detail hereinafter.

With respect to the conductor arrangement 232, the perforations 231 in the selector top, which are arrayed in a manner corresponding to the theater seating arrangement, are divided into two groups, namely group 239 and group 256 (FIG. 6) corresponding, respectively to orchestra seats and balcony seats. The conductor arrangement 232 (FIG. 7 and FIG. 8) includes a conductor network made up of conductors 240 and 241 for the orchestra perforations 239, and a network made up of conductors 257 and 258 for the balcony perforations 256. These two networks are disposed at different levels.

Referring to the network for the orchestra perforations 239, the conductors 240 extend from the front of the selector toward the back and are secured to the front of the selector by springs 242, which can be suitably insulated from the selector cabinet wall 220. The end of the conductors 240 opposite the spring 242, are in electrical contact with connectors 244, which in turn, are electrically connected to the conductors 247 which are circuits described in detail hereinafter. The conductors 241 extend from one side of the selector toward the other side thereof, and, as can be seen in FIG. 8, are secured to the selector at one end by spring 248, and at their other ends are electrically connected to a connector 249, which in turn, is connected to conductors 250 which serve to place the 241 conductors in an electrical circuit, also described in detail hereinafter.

The network made up of conductors 257 and 258, which network corresponds to the balcony seats, is similar to the network made up of conductors 240 and 241. This network of conductors 257 and 258 is positioned at a lower level than the network made up of conductors 240 and 241. Further, conductors 257 underlie conductors 241. See FIG. 8. This makes it necessary to provide the depressed contacts 259 with an opening 260 through which conductors 241 can pass. See FIG. 7b. The opening 260 is proportioned so that the depress contact 259 will not come into electrical connection with conductor 241 passing through the opening, at any time including upon operation of the depress contacts 259. If desired, the opening 260 can be lined with insulation so that such contact would not interfere with operation.

The physical and electrical connection of conductors 257 and 258 is generally similar to that of conductors 240 and 241. Thus, the conductors 258 are connected to the front of the selector by a spring 260 which is suitably insulated from the selector wall 220, and the other ends of conductors 258 are connected to electrical connector 261, to which in turn is connected a conductor 266; and conductors 257 are connected to the selector wall 212 by springs 262 and, further, are connected to electrical connector 263 which is connected to the conductor 267.

Conductors 240 and 241 are bare and, as can be seen in FIG. 7 and FIG. 8 the conductors 240 are disposed a short distance below and cross conductors 241. Due to the spring mounting by springs 248 and 242, the conductors will yield to a downwardly directed force, and, by application of such force to one of the upper conductors 241, the upper conductor can be brought into contact with one of the lower conductors 240, whereby electrical connection can be made. Conductors 257 and 258 are also bare, are arranged in like manner and can be contacted in the same way.

The conductor arrangement 232 includes the supporting block 246 which has arm 245 (FIG. 7) in which the connectors 244 and 261 are secured and arm 245a (FIG. 8) in which the connectors 249 and 263 are secured. Further, this block houses two sets of depress contacts, depress contacts 251 for the network made up of conductors 240 and 241, and depress contacts 259 for the network of conductors made up of conductors 257 and 258. The depress contacts 251 and 259 are similar in construction to depress contacts 233 in the block 234 which is contained in the hood 224, and the mounting of the depress contacts 251 and 259 in block 246 is similar to the mounting of depress contacts 233 in block 234 except that in the case of depress contacts 251 and 259, the springs urge the contacts to the upper position, rather than to the lower position as is the case for depress contacts 233.

The conductors 240 and 241 cross at locations directly beneath perforations 231 in the top of the selector and the depress contacts are aligned with the conductor crossing points and the perforations, so that upon insertion of an end of a stylus in one of the perforations 231 of the perforation group 239, the corresponding depress contact 251 can be moved downwardly so that it engages one of the conductors 241, and in turn, moves this conductor 241 downwardly to engagement, and therefore electrical connection with one of the conductors 240. Thus, if the stylus is energized, the conductors brought into contact by depressing a depress contact 251 with the stylus, the conductors so contacted can be energized. In a similar manner electrical connection can be made between a conductor 257 and a conductor 258. This is the general manner of operation of the conductor arrangement 232.

As is indicated in FIG. 7, FIG. 8, and in detail in FIG. 7e, the conductors 240 and 241 can be suitably isolated from each other by a sheet of insulation 243 which has perforations 243a suitably positioned so that electrical connection can be made as is desired upon depressing the upper conductor 241. The insulation will serve to prevent electrical contacting of the conductors at undesired places. The conductors 257 can be insulated from the conductors 258 in a similar manner by insulation sheets 242b.

The operation of the device shown in the drawings can now be described. Assuming that it is desired to issue a ticket for Monday, evening, November 11, 1963 for orchestra Seat 104 in Row D, priced at $4.80, the operator of the ticket issuing system selects the appropriate performance chart for the performance defined, this chart being the chart shown in FIG. 4. The performance chart is then placed in the recess 223 in the selector top 222, with the end of the chart bearing perforations 208–212d inserted under the code hood 224 and with the theater seat layout area 214 of the chart over the perforations 231 in the selector top. When the chart 207 (FIG. 4) is properly positioned on the selector, the perforations 268 in the chart 207 will be aligned with the corresponding perforations 231 in the selector top (FIG. 6), and one of the depress contacts 233 under the hood 224 will be aligned with each of the perforations 208–212d in the performance chart 207.

Means are provided for indicating that the performance chart 207 is properly positioned on the selector. Referring to FIG. 8a and FIG. 6, as the performance chart 207 is moved under the hood 224, the leading edge of the performance chart engages the depress contact 271 and the chart forces the depress contact upwardly. The depress contact is mounted in the block 269 in a manner similar to the mounting of depress contacts 233 in the block 234 (FIG. 7) and the depress contact 271 is resiliently urged downwardly so that the sliding of the chart 207 under the lower end of the contact serves to raise the contact. Upon further movement of the chart toward the in-place position, the chart engages depress contact 270 which is mounted in block 269 in a manner similar to the mounting of depress contact 271 in the block 269, and, also in a similar manner to operation of the depress contact 271, the chart forces the depress contact 270 upwardly. Upon upward movement of the depress contact 270, it engages the contact 272 which is energized. The depress contact 270 is electrically connected to depress contact 271 by conductor 277, and the energizing of the contact 270 by its engagement with contact 272, therefore, serves to energize the depress contact 271. As the chart is moved into the in-place position, the positioning hole 213 in chart 207 (also shown in FIG. 4) moves under the lower end of the depress contact 271, and this lower end of depress contact 271 moves into the opening 213. The selector top 222 is provided with an opening 273 directly beneath the depress contact 271 and upon depression of the hood 224, the depress contact moves on through opening 273. A contact 274 is disposed in alignment with the depress contact 271 beneath the opening 273, and upon movement of the depress contact 271 through the opening 273, the contact comes into electrical engagement with the contact 274. Conductor 275 leads from the contact 274, and is connected to a signal light. With the chart 207 properly positioned, i.e. so that the depress contact 271 is in electrical engagement with the contact 274, the light will be supplied with energy from the contact 272 and will provide a visual indication that the chart is properly positioned.

After the performance chart 207 has been positioned on the selector 204, a ticket from the appropriate ticket set (orchestra, evening, $4.80) is taken from the ticket storage cabinet 206 and is positioned in the ticket receiver 227 shown in FIG. 5, FIG. 11, and FIG. 11a. The ticket is slid through the opening 282 in the ticket receiver 227. The ticket receiver 227 is outfitted with a position indicating means the same in construction and operation as the position indicating means shown in FIG. 8a, for indicating the proper positioning of the performance chart 207. This position indicating means for the ticket includes the depress contacts 279 and 280, indicated in FIG. 11a. The arrangement of these contacts and the electrical and mounting structure associated therewith, when viewed as is indicated by the arrow 281 in FIG. 11a, and in cross-section, is the same as is shown for the depress contacts 270 and 271 for the performance chart position indicating system shown in FIG. 8a. The ticket blank inserted in the receiver is shown in FIG. 3 and is provided with a positioning hole 287 for cooperation with the contacts 279 and 280 in the manner that the contacts 270 and 271 cooperate with the positioning hole 213 in the performance chart 207.

Referring now to FIG. 12, wherein a schematic wiring diagram for the electrical system is shown, the proper positioning of the chart 207 on the selector top 222 will be indicated by the light 283. The circuit for this light includes relay 284, and upon this circuit being energized so that the light 283 lights, the relay 284 serves to energize the circuit including the positioning indicating system for the blank ticket. Thus, operation of the relay 284 serves to energize the contact 285, and with the blank ticket 202a properly positioned in the ticket receiver 282 (FIG. 11), the ticket will be disposed under the depress contact 280 and will lift this depress contact so that it is energized by the contact 285. The depress contact 280 is electrically connected with depress contact 279 by conductor 286, and, when the blank ticket 202a is properly positioned, the positioning hole 287 in the ticket will be aligned with depress contact 279 so that the lower end of this depress contact can pass through the positioning hole 287 and onto electrical connection with the contact 288. The last-mentioned contact is in electrical connection with the indicating light 289. Thus, upon the performance chart 207 and the blank ticket 202a being properly positioned, the light 289 will give a visual indication of the ready condition of the apparatus.

The circuit including the indicating light 289 includes relay 290, and, upon power being supplied to the circuit including relay 290, conductor 291 is energized. This conductor is connected to the stylus 292 and, by branch conductor 293, to the plate 238 which underlies the depress contacts 233 in the performance chart hood 224.

Figure 6A:
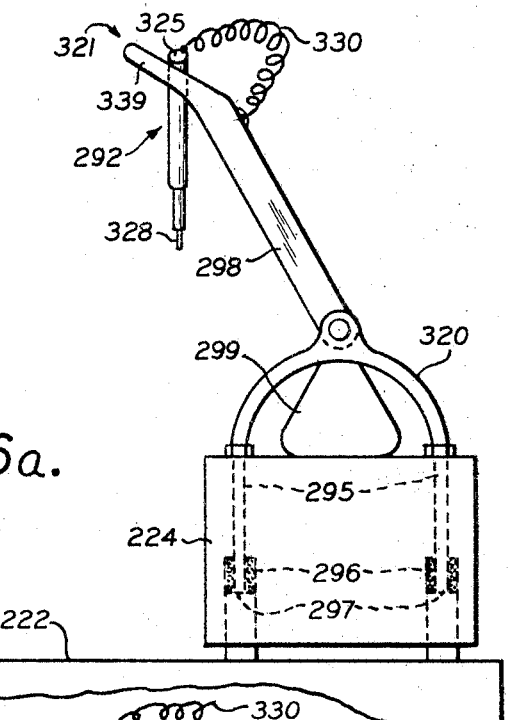
FIG. 6a is a side elevation view taken along line 6a—6a in FIG. 6 and showing in side elevation the upper portion of the selector.

When the operator observes that both indicating lights, light 289 and light 283 are lit, so that it is apparent that the apparatus is in condition for operation, the hood 224 can be lowered. See FIG. 6 and FIG. 6a. As is shown in FIG. 6a, the hood 224 is slidably mounted on posts 295 which include shoulders 297 against which springs 296 work and serve to urge the hood 224 to the upper position. A yoke 320 interconnects adjacent posts 295 and has mounted thereon a crank lever 298. Upon manual manipulation of the end 321 of the crank lever 298, to move the end 321 downwardly, the presser 299 which is integral with the crank lever is turned so as to force the hood 224 downwardly.

Referring to FIG. 7, upon downward movement of the hood 224, the depress contacts 233 are urged downwardly. Perforations in the performance chart 207 aligned with depress contacts 233 will permit the depress contacts to pass through the performance chart and onto electrical connection with the plate 238. Thus, contacts corresponding to perforations in the performance chart 207 beneath the hood will be energized. The cross-section shown in FIG. 7, is along line of contacts 310 indicated in FIG. 6. As noted above, this line of contacts is for one of the digits of the day of the month. In the example here considered, the date is November 11, and, accordingly, the perforation 310a (FIG. 7) in performance chart 207 for one of the digits of the day of the month, will be aligned with an appropriate contact of the depress contacts 233. As shown in FIG. 7, the perforation 310a is aligned with the depress contact 233a. Further, the depress contact 233a is connected with an appropriate wheel in the electronic printer 205 (FIG. 5), so that upon the depress contact 233a passing through perforation 310a to electrical engagement with plate 238, the electronic printer will be energized to print, in the appropriate area of the ticket, the digit of the date. In like manner, the information as to month, year, and day of the week, which information is coded on the performance chart, will be sensed and appropriate signals will be transmitted to the electronic printer to occasion the appropriate printing on the ticket.

The stylus which is energized upon closing of relay 290 is shown in detail in FIG. 10. The stylus includes a body portion 321 having an axial bore 336 in which there is received the elongated conductor 324. The elongated conductor 324 is axially slidable in the bore 336. The conductor 324 includes the enlarged portion 326 and this enlarged portion is received in recess 322 in the stylus body body portion 321. End piece 327 is threaded onto the body portion 321 and provides a shoulder 325 for arresting downward movement of the conductor 324. A spring 337 is contained in the recess 322 of the body portion 321 and serves to urge the conductor 324 downwardly so that the enlarged portion 326 is in engagement with the shoulder 325. The conductor 324 extends on through the end pieces 327 and terminates in a contact end 328 which is disposed outwardly of the end piece 327. Between the end piece 327 and the conductor 324 where the conductor emerges from the end piece, is an ink pad 329 which serves a purpose described hereinafter. The upper portion of the stylus body portion 321 includes contact 331 which has an enlarged upper end 333 normally in engagement with shoulder 324 of the body portion 321. A spring 332 is disposed in the bore 336 of the body portion 321 and urges the contact 331 to the downward position. In the normal condition of the stylus, when not in use, the adjacent ends of contact 331 and conductor 324 are spaced from each other a short distance in the bore 336, as is indicated in FIG. 10. An extendible conductor 330 is connected at one end to the contact 331 and its other end to the conductor 291 (FIG. 12). The stylus is provided with a T-handle 335, and, when not in use the stylus can be placed on the rest 339 of the crank lever 298 (FIG. 6 and FIG. 6a).

To impart to the ticket to be issued information which is variable with respect to the performance chart 207, but is specific with respect to the particular space which is to be sold, the stylus 292 is manually manipulated to place the contact end 328 of the stylus in the perforation in the performance chart 207 corresponding to the space to be sold. In the example here considered, the space to be sold is Seat 104 in Row D. The perforation on chart 207 for this seat is perforation 215 (FIG. 4). Thus, the contact end of the stylus is passed through perforation 215 and on through the corresponding perforation in the top of the selector, and then on until the contact 328 of the stylus engages one of the conductors 241. Upon further downward movement of the stylus, the spring 337 of the stylus is depressed so that the body portion 321 of the stylus moves downwardly with respect to the stylus conductor 324, until the lower end of the upper contact 331 in the stylus bore 336 comes into electrical connection with the upper end of the conductor 324 in the stylus bore 336. The contact end 328 of the stylus is then energized. Upon further downward movement of the stylus, the conductor 241 is moved downwardly until it comes into electrical connection with the conductor 240. At this point, the conductor 240 and the conductor 241 are energized.

The conductor 241 is contained in an electrical circuit arranged to convey to the electronic printer information as to seat number (in the instant example Seat 104) and section (in the instant example "center"). Thus, conductor 241 is in a circuit which is provided with relays 341 and 342 connected in series. Upon energy being supplied to conductor 241, relay 341 is closed and in turn energizes conductor 343 which is connected to a wheel in the electronic printer 205 provided to print on the ticket, the seat number. Relay 342 closes a circuit including the conductor 344 and this circuit includes a wheel in the electronic printer provided to imprint on the ticket the section in which the space is located. The conductor 240 is included in a circuit having series connected relays 345 and 346. Operation of relay 345 in response to energy being supplied to conductor 240, serves to close a circuit including the conductor 347, which circuit includes a wheel in the electronic printer provided to imprint the ticket to indicate the row, in the example here considered, Row D.

The relay 346, which is in series with relay 345 is utilized to control the operation of a circuit which serves not to imprint information on the ticket, but rather to operate the registers contained in the selector for indicating the amount of sales made. The totals shown by these registers can be seen through windows 226 in the front of the selector 204 (FIG. 5).

As explained above, with reference to FIG. 6, there are two lines of depress contacts under the hood 224 for the registering of the amount of a ticket sale, namely lines of contacts 312 and 412. One line of these contacts corresponds to the four evening prices, while the other line of contacts corresponds to the four matinee prices. Further, each of the performance charts is provided with four perforations, and the four perforations will be aligned with either the 312 or 412 depress contacts in the hood, depending on whether the performance chart is for a matinee or evening performance. In the example here considered, the performance is for evening, and the performance chart 207 (FIG. 4) is provided with four perforations 212a, 212b, 212c, and 212d, which are positioned so that one of these perforations will be aligned with each of the depress contacts in the line of depress contacts 312. When the hood 224 is depressed, all of the contacts in the lines 312 and 412 will be moved downward, and, contacts over perforations will move through the chart and on into electrical connection with the bars 351, 352, 353, and 354 (FIG. 12). Each of the depress contacts in line 312 is at all times in electrical connection with the appropriate counter for evening price tickets, and actuation of a counter to indicate a sale depends upon whether or not energy is supplied to the bar of the group 351–354 with which the contact is in electrical connection when the hood is depressed. In the present example, the relay 346 which is in the circuit including conductor 240, is actuated by the stylus and serves to close the circuit including conductor 355 which is connected to the bar 351. Thus, the depress contact 312a is supplied with power. This depress contact is in the circuit including the counter for $4.80 tickets, and, thus this counter is actuated and the sale is recorded.

The processing of the ticket and the recording of the sale by the registering device in the selector, is now complete.

The electronic printer 205 can include means to indicate completion of the operation, and upon indication of completion, the ticket can be withdrawn. Thus, the time delay switch 361 is connected to conductor 355 by lead 360 and following energization of the time delay switch the light 362 is lit. Alternatively, the time delay switch could be connected to a circuit in which each of the printing circuits and the tallying circuit are connected in series so that the time delay switch could not be actuated until all printing and the tallying are completed. The ticket will then be imprinted or perforated with information as is indicated on issued ticket 202b shown in FIG. 3a.

As noted above, the end piece 327 of the stylus 292 (FIG. 10) includes a small ink pad 329. Upon depressing the stylus to actuate the wiring arrangement 232 disposed within the selector 204 this ink pad comes in contact with the area of the performance chart 207 adjacent the hole 215 and marks the chart as is indicated in FIG. 4 with a dark ring about the perforation 215. This dark ring indicates that the space has been sold. Thus, an indication of available space can be obtained by observance of the performance chart.

If desired, provision can be made for indicating on the performance chart spaces for which tickets have been issued and returned. Thus, which well in advance of a given performance, the ticket vending system may be utilized to issue a plurality of tickets to a broker for ultimate sale by him, shortly before the performance the broker may wish to return tickets which he has not sold. Such unsold tickets could be deposited at the central place for the selling operation and could be held for sale in the manner in which tickets are conventionally held for sale at ticket distribution centers. For such operation wherein returns from brokers are expected, it would be desirable to provide for marking the appropriaate perforations of the performance chart, to indicate that the previously issued ticket has been returned. To this end, a stylus outfitted with an ink pad, in the manner that the stylus in FIG. 10 is outfitted with ink pad 329, can be used for the inking to indicate the return. Referring to the performance chart in FIG. 4, the perforation 215 is marked with a ring to indicate that the ticket for the corresponding space has been issued; perforations 215b is marked to indicate that the corresponding ticket has been issued and returned. Appropriately contrasting colors can be used. Thus, the marking at the perforation 215 can be yellow, which color at a perforation would indicate issuance and that the ticket is either sold or outstanding in the hands of a broker or at an auxiliary selling station, and the marking at perforation 215b is dark, for example black, indicating that the corresponding ticket has been issued and returned. The dark marking at the perforation 215b would, of course, be an over-printing of a previous yellow marking at this perforation, since the corresponding ticket was issued, and at that time the perforation 215b would have been marked in yellow.

Thus, the invention provides a system for vending tickets with markings designating particulars for each ticket sold, including the space accommodation, that is the seat and row, and, if desired, the location in the theater section involved, such as the "center left" of the balcony or "left" of the orchestra. The system includes a performance chart having the space arrangement for the theater laid out thereon and the layout includes an area for each of a plurality of the theater seats or spaces. A selector is provided and this equipment includes an electrical circuit means for each space of the spaces laid out on the chart. The electrical circuit means are disposed in an array corresponding to the space arrangement layout on the performance chart. Also provided are means for mounting the performance chart on the selector with the orientation of the performance layout on the chart corresponding to the array of the electrical circuit means. Further, the system includes means for selectively actuating the electrical circuit means corresponding to a selected space from among the plurality of spaces available, by reference to the performance chart and selection of the area thereof for the desired space. A ticket marker including means for receiving a blank ticket in a position for marking thereof to designate thereon the space accommodation for which the ticket is to apply, is also included in the system, and the ticket marker is operatively connected to the electrical circuit means for the spaces and responsive to actuation of the electrical circuit means for the selected space and effective to mark a ticket positioned on the marker as aforesaid to indicate the desired space.

The electrical circuit means for the selector apparatus can comprise a conductor arrangement including a first conductor network wherein a plurality of conductors are disposed in crossing relation, the crossings defining the said array corresponding to the space arrangement layout on the performance chart. The conductors at each crossing are spaced from each other and one of the conductors at each crossing is displaceable permitting movement thereof into contact with another conductor of the crossing, the conductors at the crossings being bare so that electrical connection is made therebetween upon contacting thereof as aforesaid. Thus, in the crossing of the electrical circuit means for the selected space can be actuated by displacement of one of the conductors of the crossing.

Desirably, there is a conductor crossing for each of the areas laid out on the performance chart, and, with the performance chart mounted on the selector, the crossing for each of the spaces in the conductor network underlies the corresponding area on the performance chart.

The layout on the performance chart can be such that it permits designation of spaces by a two-dimensional coordinate system, such as the space designation system for the perforations 214 of the performance chart shown in FIG. 4, whereby space accommodations are indicated by row letter, and seat number. The conductor network of the electrical circuit means can include a first group of conductors corresponding to one coordinate of the coordinate system and a second group corresponding to the other coordinate of the coordinate system, while the conductors of the first group are in crossing relation with respect to the conductors of the second group. Thus, referring to FIG. 7, in the network made up by conductors 240 and 241, the conductors 240 make up one group, while the conductors 241 make up the other group. The ticket marker can include a first marker member and a second marker member. The connection between the electrical circuit means and the marker can include a connection between the first group of conductors and the first marker member and a second connection between the second group of conductors and the second marker member, so that the first marker member is accommodated to receive a signal for one of the coordinates and the second marker member is accommodated to receive a signal for the other coordinate. Further, the marker can include third marker member for indicating a group of seats, such as the center seats in the orchestra section shown in the seating plan of FIG. 2.

Referring to FIG. 12, the network of conductors which includes conductors 241 and 240, is electrically connected with the marker 205 as is described above. Conductor 241 is electrically connected with the marker member 362 which is provided for marking the blank ticket with the seat number. Conductor 240 is connected with marker member 361 and is provided for marking the blank ticket with the row letter. The marker member 361 works off the conductor 241, as has been described hereinbefore, and is provided to mark the blank ticket with the group designation of the group of seats in which the selected seat is located, such as center seats in the orchestra. The conductors 240 and 241 are in the conductor network which services the orchestra seats. A second conductor network can be provided to service the balcony seats. The marker 205 includes marker members 363, 364, and 365 for working with the network provided for the balcony seats.

As mentioned above, the conductor arrangement of the electrical circuit means can include a second conductor network; this second network can be similar to the first-mentioned conductor network. Referring to FIG. 7 and FIG. 8, the conductors 240 and 241 make up one conductor network, while the conductors 257 and 258 make up the other conductor network. These networks are transversely offset and vertically spaced from each other. Corresponding to the two network conductor arrangement, the performance chart, as is shown in FIG. 5 includes a first group of areas corresponding to the first-mentioned network and a second group of areas corresponding to the second-mentioned network. Thus, the areas for orchestra seats made up of the areas indicated by the reference numerals 216 and 217, together for a first group of areas corresponding to the conductor network of conductors 240 and 241, and the seat areas for the balcony indicated by the reference numerals 218 and 219 make up a second group of areas corresponding to the network made up of conductors 257 and 258.

The system of the invention can also include a counter for totalling ticket sales. The counter is operatively connected to the electrical circuit means for the spaces and is responsive to actuation circuit means for the spaces and is responsive to actuation of the electrical circuit means for the selected space and is effective to record sale of the tickets. For the totalling of sales, the performance chart 207 can be coded by perforation at selected portions of the chart, for ticket prices, there being a perforation for each ticket price for the performance of the chart. Thus, referring to FIG. 4, the performance chart 207 includes the perforations 212a, 212b, 212c, and 212d for evening prices. The selector 204 has within the hood 224 a plurality of price depress contacts including a first group made up of the depress contacts 312 and a second group made up of the depress contacts 412 (see FIG. 6). With the performance chart positioned on selector 204, one group of the price depress contacts overlies the perforations 212a–212d, and are aligned with these perforations. Upon depressing the hood 224 as is described hereinbefore, the last-mentioned group of price depress contacts passes through the price perforations in the chart 207 and on to electrical connection with the contacts or conductors 351, 352, 353, and 354 (FIG. 12), while the other group of price depress contacts abuts with the performance chart and, since the depress contacts are spring mounted permitting upward movement of the contacts, this second group of contacts is forced upwardy into the hood and this group is inoperative with respect to performance chart 207. The conductors 251–354 are in an electrical circuit which includes the price depress contacts and the counter which includes a plurality of counter member corresponding to the price depress contacts, and are connected with the price depress contacts for tallying ticket sales in correspondence with ticket prices. The electrical circuit means for the spaces which includes the conductor arrangement, is electrically connected to the price depress contact conductors 351–354 for selective energization of the price detent contact conductor corresponding to the space selector, so that the counter member corresponding to the space selector can be actuated. In the embodiment shown in the drawings, price is dependent on the row, and, accordingly, a signal as to price can be obtained from conductors 240 and 258 (FIG. 7). As is shown in FIG. 12, a conductor 240 is electrically interconnected with one of the conductors 351–354, and upon selection of a seating space as is represented in FIG. 12, the conductor 351 is energized to in turn energize the depress contact 312a so that a signal is passed to the appropriate counter member. The counter members include registering wheels visible through the windows 225 and 226 (FIG. 12).

Further according to the invention, the performance chart can be coded with information applying to the particular performance to which the chart applies, and the ticket marker can include a marker member for marking the tickets with information corresponding with the said coded information on the chart. Means are provided for sensing the coded information on the chart and such means are effective to actuate the marker member for the coded information for the marking of the tickets. Thus, as is described above, the performance chart 207 (FIG. 4) is provided with perforations 208–211 for the day of the week, month, day of the month, and year. As shown in FIG. 12, the marker 205 is provided with marker members 366, 367, 368, 369 and 370 for marking the ticket with information corresponding to the information coded on the chart. As described hereinbefore, depress contacts in the lines of depress contacts 308–311 (FIG. 6) sense appropriate perforations, pass through the chart perforations making a suitable electrical connection so that a signal is sent to the marker 205 to effect the appropriate marking. Thus, as is shown in FIG. 12, the depress contact 233a passes through the perforation 310a in the performance chart 207 making electrical connection with the connection with the conductor 238 which is energized provided the performance chart is properly positioned on the selector. By reason of connection as described, a signal is passed to the marker member 369 and appropriate marking of the ticket is effected.

In the embodiment shown in the drawing, which is a preferred embodiment, each of the performance chart areas representing particular space accommodations has a perforation for such accommodation, and the means for mounting the chart on the selector includes a recessed area 223 (FIG. 5) which provides a rest for receiving the chart. The rest is perforated so that each chart perforation is aligned with a rest perforation, and as can be best seen in FIG. 7 and FIG. 8, the conductor crossings of the conductor arrangement within the selector are aligned with and spaced from the rest perforations. Depress contacts 251 are mounted in the selector intermediate the conductor crossings and the rest perforations, and there is a depress contact for each crossing and each rest perforation. The depress contacts are resiliently urged away from the crossings and toward the rest perforations. The selector includes the stylus 229 (FIG. 5) for insertion through the performance chart perforation for the selected spaced, on through the corresponding perforation in the rest and to engagement with the depress contact aligned with such perforations. The stylus is movable to depress the depress contact for forcing the wires at the corresponding crossing into contacting relation. Thus, the conductors of the crossing can be energized for actuation of the marker members associated therewith, so that thereby printing or marking of the ticket blank can be effected.

What is claimed is:

1. System for vending tickets with markings designating particulars for each ticket sold including the space accommodation, comprising:
   (a) a performance chart having the space arrangement laid out therein and including an area for each of a plurality of spaces,
   (b) selector apparatus including electrical circuit means for each space of said plurality of spaces, the electrical circuit means for the spaces being disposed in an array corresponding to the space arrangement layout of the performance chart,
   (c) means for mounting the performance chart on the selector with the orientation of the performance layout corresponding to said array of the electrical circuit means,
   (d) means for selectively actuating the electrical circuit means corresponding to a selected space from among said plurality of spaces by reference to the lay out of the performance chart and selection of the area thereof for said desired space,
   (e) a ticket marker including means for receiving a blank ticket in position for marking thereof to designate thereon the space accommodation for which the ticket is to apply,
   (f) said ticket marker being operatively connected to the electrical circuit means for the spaces and responsive to actuation of the electrical circuit means for the selected space and effective to mark a ticket positioned on the marker as aforesaid to indicate the desired space.

2. System for vending tickets according to claim 1, wherein the electrical circuit means of the selector apparatus comprises a conductor arrangement including a first conductor network wherein a plurality of conductors are disposed in crossing relation, the crossings defining said array corresponding to the space arrangement layout on the performance chart, conductors at each crossing being spaced from each other, one of the conductors at each crossing being displaceable permitting movement thereof into contact with another conductor of the crossing, the conductors at said crossings being bare so that electrical connection is made therebetween upon contacting thereof as aforesaid, whereby the crossing of the electrical circuit means for said selected space can be actuated by displacement of one of the conductors of the crossing.

3. System for vending tickets according to claim 2, wherein there is a conductor crossing for each of the areas laid out on the performance chart and, with the performance chart mounted on the selector, the crossing for each of the spaces in the conductor network underlies the corresponding area on the performance chart.

4. System for vending tickets according to claim 2, wherein the layout on the performance chart permits designation of spaces by a two dimensional coordinate system, said conductor network of the electrical circuit means comprising a first group corresponding to one coordinate of the coordinate system and a second group corresponding to the other coordinate of the coordinate system, the conductors of said first group being in said crossing relation with respect to the conductors of said second group, said ticket marker comprising a first marker member and a second marker member, the connection between the marker and the electrical circuit means including a connection between said first group of conductors and said first marker member and a connection between said second group of conductors and said second marker member, whereby the first marker member is accommodated to receive a signal for one of the coordinates and the second marker member is accommodated to receive a signal for the other coordinate.

5. System for vending tickets according to claim 4, said marker including a third marker member, said third marker member being connected to one of said groups of conductors.

6. System for vending tickets according to claim 1 and including a counter for totalling ticket sales, said counter being operatively connected to the electrical circuit means for the spaces and responsive to actuation of the electrical circuit means for the selected space and effective to record sale of the ticket.

7. System for vending tickets according to claim 4, and including a counter for totalling ticket sales, said counter being operatively connected to one of the groups of conductors.

8. System for vending tickets according to claim 6, and including a counter for totalling ticket sales, said counter being operatively connected to one of the groups of conductors.

9. System for vending tickets according to claim 1, said performance chart being coded with information applying to the performance, said ticket marker including a marker member for marking the ticket with information corresponding with said coded information on the performance chart, means for sensing the coded information on the performance chart and effective to actuate the marker member for the coded information for the marking of the ticket.

10. System for vending tickets according to claim 4, said performance chart being coded with information applying to the performance, said ticket marker including a marker member for marking the ticket with information coresponding with said coded information on the performance chart, means for sensing the coded information on the performance chart and effective to actuate the marker member for the coded information for the marking of the ticket.

11. System for vending tickets according to claim 7, said performance chart being coded with information applying to the performance, said ticket marker including a marker member for marking the ticket with information corresponding with said coded information on the performance chart, means for sensing the coded information on the performance chart and effective to actuate the marker member for the coded information for the marking of the ticket.

12. System for vending tickets according to claim 3, each of said performance chart areas having a perforation for the space accommodation to which the area applies, said means for mounting the performance chart on the selector including a rest for receiving the chart, the rest being perforated so that each chart perforation is aligned with a rest perforation, the conductor crossings being aligned with and spaced from the rest perforations, depress contacts mounted in the selector intermediate the conductor crossings and the rest perforations, there being a depress contact for each crossing and each rest perforation, means resiliently urging the depress contacts away from the crossings and toward the performance chart rest, a stylus for insertion through the performance chart perforation for the selected space, on through the corresponding perforation in the rest to engagement with the depress contact, the stylus being movable to depress the depress contact for forcing the wires at the corresponding crossing into contacting relation.

13. System according to claim 12, the stylus being energized, and the depress contacts being conductive whereby conductors of a conductor crossing can be energized by bringing the conductors in contacting relation with the stylus to actuate the electrical circuit means for the selected space for the marking of the blank ticket.

14. System for vending tickets according to claim 9, the performance chart coding comprising at least one code perforation at a selected position on the chart, the said maens for sensing the coded information including a plurality of code sensing depress contacts, which with the chart positioned on the selector, are disposed in alignment with code perforations, the code sensing depress contacts being movable for passage of the contacts through code perforations, the sensing means further including conductor means for electrical contact with code depress contacts passed through code perforations, the code sensing depress contacts and conductor means being in a circuit including said code information marker member.

15. System for vending tickets according to claim 6, said performance chart being coded by perforations at selected positions, for ticket prices, there being a perforation for each ticket price for the performance, a plurality of price depress contacts including a first group and a second group, which with the performance chart positioned on the selector, overlie the performance chart with said first group of price depress contacts aligned with the chart price perforations, said price depress contacts being movable for passage through chart price perforations aligned therewith, and being resiliently mounted for raising of contacts out of alignment with chart perforations upon engagement of the price depress contacts with the performance chart (whereby the price depress contacts can be moved to pass the first group thereof through the performance chart price perforations) a price depress contact conductor for each price depress contact positioned for electrical connection therewith by its depress contact upon passage of the contact through a price perforation in the chart, said conductors being in an electrical circuit including the price depress contacts and the counter, said counter including a plurality of counter members corresponding to the price depress contacts and connected with the price depress contacts for tallying ticket sales in correspondence with ticket prices, said electrical circuit means for the spaces being electrically connected to the said price depress contact conductors for selective energization of the price depress contact conductor corresponding to the space selected, whereby the counter member corresponding to the space selected can be actuated.

16. System for vending tickets according to claim 12, said performance chart being coded with information applying to the performance, said ticket marker including a marker member for marking the ticket with information corresponding with said coded information on the performance chart, means for sensing the coded information on the performance chart and effective to actuate the marker member for the coded information for the marking of the ticket, the performance chart coding comprising at least one code perforation at a selected position on the chart, the said means for sensing the coded information including a plurality of code sensing depress contacts, which with the chart positioned on the selector, are disposed in alignment with code perforations, the code sensing depress contacts being movable for passage of the contacts through code perforations, the sensing means further including conductor means for electrical contact with code depress contacts passed through code perforations, the code sensing depress contacts and the conductor means being in a circuit including said code information marker member.

17. System for vending tickets according to claim 16, said performance chart being coded by perforations at selected positions for ticket prices, there being a perforation for each ticket price for the performance, a plurality of price depress contacts including a first group and a second group, which with the performance chart positioned on the selector, overlie the performance chart with said first group of price depress contacts aligned with the chart price perforations, said price depress contacts being movable for passage through chart price perforations aligned therewith, and being resiliently mounted for raising of contacts out of alignment with chart perforations upon engagement of the price depress contacts with the performance chart, whereby the price depress contacts can be moved to pass the first group thereof through the performance chart price perforations, a price depress contact conductor for each price depress contact positioned for electrical connection therewith by its depress contact upon passage of the contact through a price perforation in the chart, said conductors being in an electrical circuit including the price depress contacts and the counter, said counter including a plurality of counter members corresponding to the price depress contacts and connected with the price depress contacts for tallying ticket sales in correspondence with ticket prices, said electrical circuit means for the spaces being electrically connected to the said price depress contact conductors for selective energization of the price depress contact conductor corresponding to the space selected, whereby the counter member corresponding to the space selected can be actuated.

18. System for vending tickets according to claim 17, each of said performance chart areas having a perforation for the space accommodation to which the area applies, said means for mounting the performance chart on the selector including a rest for receiving the chart, the rest being perforated so that each chart perforation is aligned with a rest perforation, the conductor crossings being aligned with and spaced from the rest perforations, depress contacts mounted in the selector intermediate the conductor crossings and the rest perforations, there being a depress contact for each crossing and each rest perforation, means resiliently urging the depress contacts away from the crossings and toward the rest perforations, a stylus for insertion through the performance chart perforation for the selected space, on through the corresponding perforation in the rest to engagement with the depress contact, the stylus being movable to depress the depress contact for forcing the wires at the corresponding crossing into contacting relation.

19. System for vending tickets according to claim 18, said code sensing depress contacts and said price depress contacts being mounted in a hood movable between a first position in which the depress contacts are raised permitting placement of the performance chart on the selector with the code perforations and the price perforations beneath the hood, and a second position wherein the code sensing depress contacts and the price depress contacts are lowered for passage of contacts through code and price perforations, the depress contacts being resiliently mounted in the hood permitting raising thereof by engagement of the contacts with portions of the chart having no perforations.

20. System for vending tickets according to claim 12, the stylus including means for marking the performance chart adjacent the said perforation for the selected space upon insertion of the stylus through the perforation, whereby to indicate on the performance chart that a ticket for the selected space has been issued.

21. System for vending tickets according to claim 13, the stylus including means for marking the performance chart adjacent the said perforation for the selected space upon insertion of the stylus through the perforation, whereby to indicate on the performance chart that a ticket for the selected space has been issued.

22. System for vending tickets with markings designating particulars for each ticket sold including the space accommodation, for use in combination with a performance chart having the space arrangement laid out thereon and including an area for each of a plurality of spaces, comprising:
 (a) selector apparatus including electrical circuit means for each space of said plurality of spaces, the electrical circuit means for the spaces being disposed in an array corresponding to the space arrangement layout of the performance chart,
 (b) means for mounting the performance chart on the selector with the orientation of the performance layout corresponding to said array of the electrical circuit means,
 (c) means for selectively actuating the electrical circuit means corresponding to a selected space from among said plurality of spaces by reference to the performance chart and selection of the area thereof for said desired space, (d) a ticket marker including means for receiving a blank ticket in position for marking thereof to designate thereon the space accommodation for which the ticket is to apply, (e) said ticket marker being operatively connected to the electrical circuit means for the spaces and responsive to actuation of the electrical circuit means for the selected space and effective to mark a ticket positioned on the marker as aforesaid to indicate the desired space.

References Cited

UNITED STATES PATENTS

| 2,453,838 | 11/1948 | Fletcher et al. | 177—311 |
| 2,487,357 | 11/1949 | Mills et al. | 197—20 |
| 2,668,009 | 2/1954 | Schmidt | 235—60.27 |

MAYNARD R. WILBUR, *Primary Examiner.*

T. J. SLOYAN, *Assistant Examiner.*

U.S. Cl. X.R.

235—61.11